March 15, 1932.  W. A. ELLIOTT  1,849,422
AGRICULTURAL IMPLEMENT
Filed April 30, 1930  2 Sheets-Sheet 1
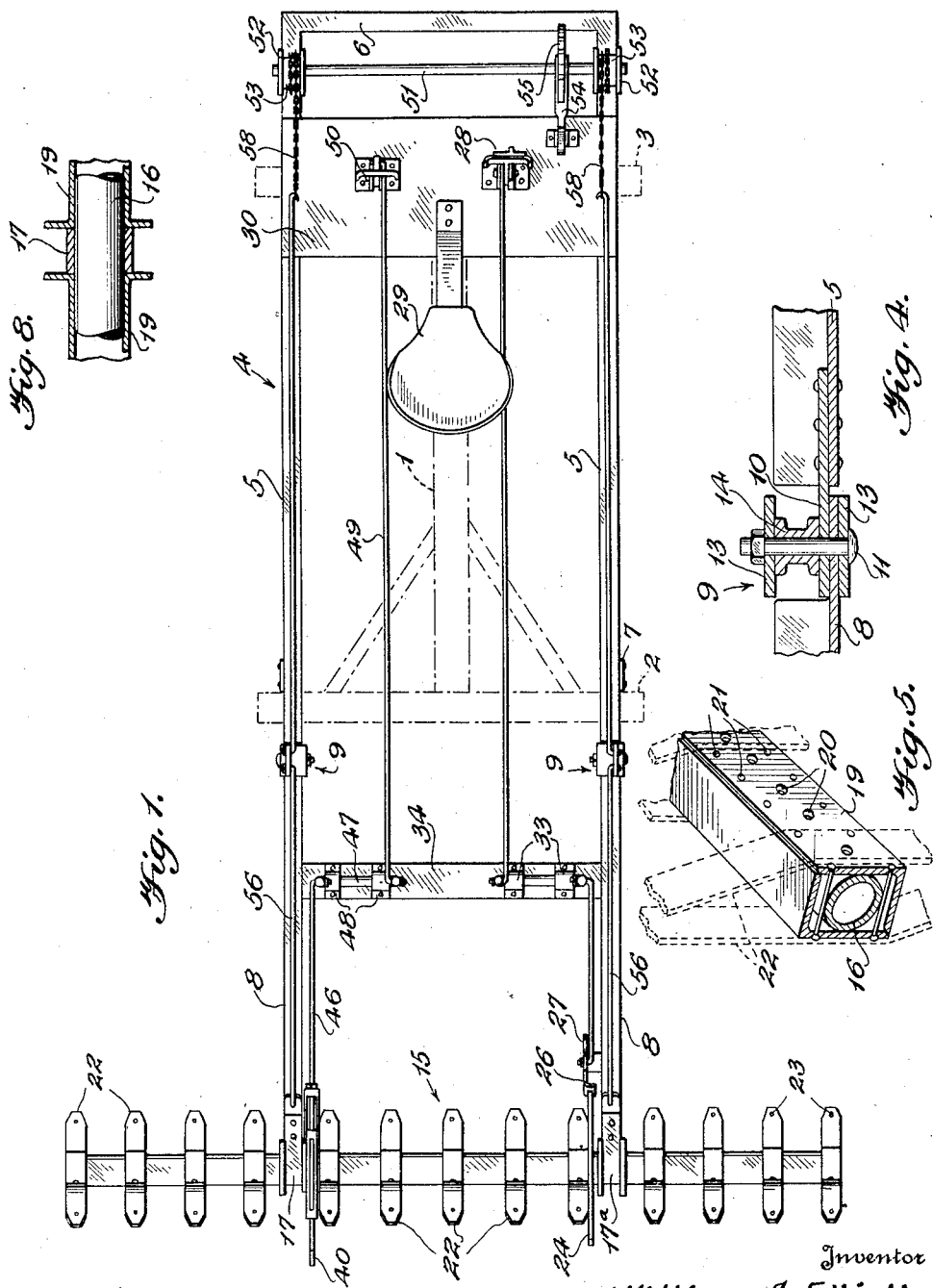
Inventor
William A. Elliott
By G. Mallet Prevost
Attorney March 15, 1932.  W. A. ELLIOTT  1,849,422
AGRICULTURAL IMPLEMENT
Filed April 30, 1930    2 Sheets-Sheet 2
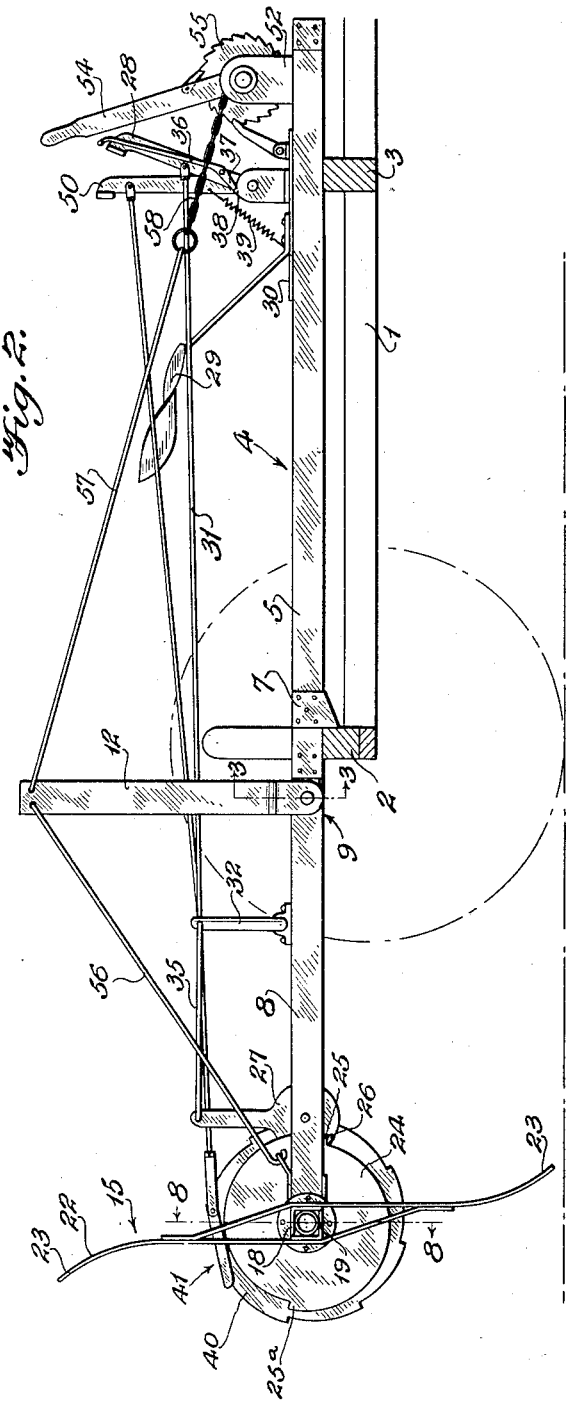
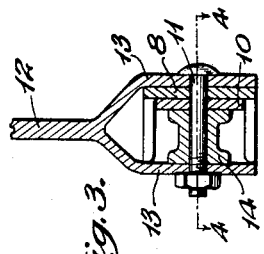
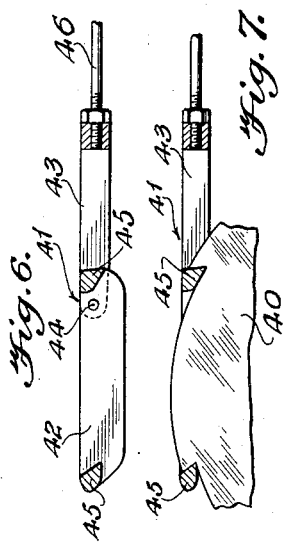
Inventor
William A. Elliott
By G. Mallet Prevost
Attorney Patented Mar. 15, 1932

1,849,422

UNITED STATES PATENT OFFICE

WILLIAM A. ELLIOTT, OF BRICKEYS, ARKANSAS

AGRICULTURAL IMPLEMENT

Application filed April 30, 1930. Serial No. 448,752.

My invention consists in new and useful improvements in an agricultural implement which comprises a combined rotor rake and spring tooth harrow and has for its object to provide a device which may be used in raking hay, weeds, corn stalks and like, said device being also capable of use as a spring toothed harrow for scarifying farm land which may have become weedy or turfy.

Another object of my invention is to provide a structure which may be readily attached to the chassis of a conventional farm wagon, including means for engaging the body bolsters of said wagon.

A further object of the invention resides in my improved means for adjusting or regulating the vertical position of the rake or harrow element with respect to the ground, and the manually controlled mechanism for locking and releasing the rotor rake.

A still further object of my invention is to provide means operable by the driver for causing the positive rotation of the rotor rake when desired.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 represents a plan view of the device in place on the chassis of a farm wagon.

Figure 2 is a side elevation of the same.

Figure 3 is a sectional view taken on line 3—3 of Figure 2, showing the means for adjustably mounting the rake or harrow element.

Figure 4 is a horizontal sectional view of said mounting means.

Figure 5 is an enlarged detail, partially broken away showing the rotor rake mounting.

Figures 6 and 7 are enlarged details of the member for positively rotating said rake element, and Figure 8 is an enlarged sectional view taken on line 8—8 of Figure 2.

In the drawings, 1 designates the chassis of a conventional farm wagon including the usual bolsters 2 and 3. 4 represents the main body portion or frame of my improved farm implement, which consists of two oppositely disposed longitudinally extending channel irons 5, secured together in spaced relation by a suitable laterally arranged cross bar 6 which may be bolted or otherwise rigidly secured in place at the forward end of said channel irons 5. On the outer face of each of the channels 5, adjacent the rear body bolster 2, I secure, by means of bolts or rivets, a plate 7 provided with a downwardly projecting lug or shoulder adapted to engage the forward face of the body bolster for retaining the frame 4 in place on the chassis 1.

The rear portion of the frame 4 consists of a pair of channel irons 8 forming extensions of the channel irons 5, being pivotally mounted at the rear extremity of the latter, as at 9. As shown in Figures 3 and 4, this pivotal mounting comprises a plate 10 bolted or riveted to the rear extremities of the channels 5 and projecting longitudinally therefrom to engage the inner faces of the channel extensions 8, said plate and extensions 8 being pivotally secured together by means of lateral bolts 11 which pass through aligned apertures in said members arranged for this purpose. 12 represents upright arms, the function of which will be hereinafter described, the lower ends of said arms being bifurcated to form a yoke 13 apertured to receive the bolts 11 and adapted to engage the outer faces of the extensions 8, the inner faces of said yoke 13 being spaced from the plate 10 by means of a filler block 14, whereby the pivotal joint 9 is prevented from lateral movement and play.

At the rear extremity of the extensions 8 I provide a combined rotor rake and harrow element 15 which comprises a laterally extending, preferably hollow, shaft 16, rotatably mounted at the rear extremities of the extensions 8 in suitable bearings 17 and 17a. This shaft is encased in a series of oppositely disposed angle irons 18 and 19, Figure 5, which are arranged along the shaft between the bearings 17 and 17a, and on either side of said bearings, as shown in Figure 1, said angle irons being rigidly secured together and to the shaft by means of bolts or screws 20 which extend through opposite faces of the angle irons and through the shaft. Throughout the length of the angle irons 18 and 19, I provide a plurality of transverse apertures 21, arranged in aligned groups, to facilitate the mounting of a series of substantially resilient or spring teeth 22, each of said teeth comprising an elongated flat strip of a sturdy, but slightly resilient metal, removably secured intermediate its ends to one face of the angle irons 18 or 19 by means of suitable bolts which extend through the apertures 21.

Each of the teeth 22 extends normally in a substantially vertical position with its free ends slightly curved away from the axis of the shaft 16 as shown in Figure 2, its opposite end being bent angularly toward the axis of said shaft and adapted to freely engage or be secured to an oppositely disposed tooth arranged on the outer face of the adjacent angle iron, whereby each tooth serves as a support or brace for the corresponding tooth on the opposite side of the rotor element.

At the free ends of the teeth 22 I preferably provide an aperture 23 for the purpose of mounting a small plow foot similar to that employed with the conventional spring tooth cultivator, whereby my improved structure may be employed as a cultivator or harrow as hereinafter set forth.

24 represents a lock wheel or disc rigidly secured on the shaft 16 adjacent the inner face of the bearing 17a and reduced on opposite sides of its axis to form a pair of oppositely disposed teeth or shoulders 25 and 25a on its periphery. The extension 8 adjacent the lock disc 24 is provided with a fulcrumed arm 27, at the lower extremity of which is located a lug 26 adapted to engage either of the teeth 25 or 25a on the forward movement of the arm 27 to prevent the rotation of the rake 24, so that when in locked position, the rake teeth 22 are substantially vertical.

The movement of the arm 27 is controlled by a foot lever 28, located at the forward end of the frame 4, a convenient distance from the driver's seat 29 which is secured to a laterally extending platform 30 mounted on said frame. Said foot lever 28 is connected to the arm 27 by means of a longitudinally extending rod 31 connected at one end to said foot lever and at the other end to one arm of a vertically disposed substantially U-shaped element 32, pivoted as at 33 on a transverse support 34 located between the extensions 8, the opposite arm of the element 32 being in turn connected to the arm 27 by a second rod. Hence, when the foot lever 28 is pressed in its forward position, the arm 27 will be drawn forwardly on its pivot so that the lug 26 will engage the corresponding tooth 25 or 25a.

In order that the operator need not retain his foot on the lever 28 to keep the lug 26 in locked position, I have provided a second spring actuated lever 36 which is fulcrumed on said first lever 28, said lever 36 terminating at its lower extremity in a lock member 37 adapted to engage a shoulder 38 on the base of the lever mounting, whereby when said lever 28 is in its forward position, the lock 37 will automatically engage the shoulder 38 and retain the lug 26 in locked position, and when the lever 36 is depressed, said lock 37 will disengage the shoulder 38 to permit the release of said lug 26 and allow the rake element 15 to rotate in the bearings 17 and 17a. It will be noted that a suitable spring arrangement 39 is provided to facilitate the return movement of the lever 28.

In order to enable the operator to cause the positive rotation of the rake element 15 when desired, I provide a toothed disc or wheel 40 on the opposite side of the shaft 16, adjacent the inner face of the bearing 17, said disc being rigidly secured to said shaft and adapted to rotate therewith. 41 represents a disc-engaging member which comprises two sections 42 and 43 pivoted together as at 44, the section 42 being longitudinally slotted to fit over a portion of the periphery of the disc 40 and provided with a pair of transverse teeth 45 located at its extremities, said teeth being so spaced on said section as to engage the corresponding teeth on the disc 40. The section 43 carries one end of a rod 46, the other end of which is secured to one arm of a second U-shaped element 47 similar to that just described as 32, said element 47 being pivotally mounted at 48 on the support 34. The other arm of the element 47 carries a longitudinally extending rod 49 which connects said element with a foot lever 50 mounted on the platform 30 adjacent the foot lever 28.

It will thus be seen that when the lever 50 is moved forwardly by the operator, the teeth 45 of the disc-engaging element 41 will interlock with the teeth of the disc 40 and cause the same to rotate the shaft 16. On the return movement of the foot lever 50, caused by a suitable spring arrangement, the pivoted section 42 carrying the teeth 45 will slide around the periphery of the disc 40 and automatically engage a new set of teeth thereon. Hence by a series of reciprocations, the rake element 15 may be completely rotated.

At the extreme forward end of the frame 4 I provide a transverse shaft 51 carried in suitable brackets 52, and adjacent each end of which is located a drum or pulley 53. Intermediate the ends of said shaft 51, preferably toward one end thereof, I provide a hand lever 54 which is adapted to operate a pawl and ratchet arrangement 55 for causing the positive rotation of said shaft 51 and with it the drums 53.

The rear ends of the extension 8 are connected to the upright posts 12 by means of rods 56, and said posts 12 are in turn connected to the drums 53 by rods 57, to the forward extremities of which are secured suitable chains or cables 58, the latter being adapted to be reeled on and off of said drums, when the shaft 51 is caused to rotate.

It will thus be seen that when the shaft 51 is rotated in clockwise direction by the handle 54, the chains or cables 58 will be reeled on the drums 52 causing a forward pull on the upright posts 12. This forward movement of the posts 12 will be transferred into a vertical movement of the extensions 8 on the pivots 9, thus facilitating the regulation of the depth of the teeth 22 with respect to the ground.

Having thus described the construction of my improved farm implement, its operation is as follows:

When it is desired to use the device for raking hay or the like, the vertical position of the rake element 15 with respect to the ground is regulated by the lever 54 as before stated, the lug 26 on the arm 27 being retained in engagement with the tooth 25 or 25a on the locking disc 24 to prevent the rotation of said rake element. As the device passes over the field, the teeth 22 rake up the hay or other material in the usual manner and when the capacity of the rake has been reached, the small lever 36 on the foot lever 28 is depressed, releasing the lock 37 from the tooth or shoulder 38 which permits the spring 39 to move the rods 31 and 35 longitudinally toward the rear to momentarily release the lug 26 from the tooth 25. This permits the rake element 15 to rotate in the bearings 17 and 17a, the windrow of hay usually being sufficient to cause the rotation of the rake element for one-half a revolution, which will bring the opposite set of rake teeth into engagement with the ground as the rake continues in its course. The foot lever 28 is immediately returned to its forward position and locked, to prevent the further rotation of the rake element. However, should the rake fail to complete its rotation, the foot lever 50 is depressed causing the member 41 to engage the teeth in the disc 40 and positively rotate said rake element.

When the device is to be employed as a harrow or for scarifying land, an additional number of teeth may be applied to the angle irons inclosing the shaft 16 by means of the apertures 21 provided for this purpose, and at the end of each tooth a small plow foot may be secured through the medium of bolts passing through the apertures 23 in the teeth. The elevation of the teeth is regulated to suit the requirements as before stated by lowering the extensions 8 on their pivots 9.

It will thus be seen that I have provided a farm implement which may be employed as a rake for all kinds of hay, weeds, cornstalks and the like and one that will scratch a substantially large strip of land at a time, at any reasonable depth, passing over any stump that a wagon will pass over, as well as an implement that will scarify lands which have become weedy and turfy.

From the foregoing it is believed that my invention may be readily understood by those skilled in the art without further description, it being borne in mind that numerous changes may be made in the details of construction without departing from the spirit of the invention as set forth in the following claims.

What I claim and desire to secure by Letters Patent is:—

1. A harrow comprising a frame adapted to be supported on a wagon chassis, a portion of said frame projecting beyond the rear extremity of said chassis, a toothed rotor element mounted transversely at the rear end of said frame, means for locking said rotor against rotation, and means for regulating the vertical position of said rotor element with respect to the ground.

2. A harrow comprising a frame adapted to be supported on a wagon chassis, a portion of said frame projecting beyond the rear extremity of said chassis, a toothed rotor element mounted transversely at the rear end of said frame, means for locking said rotor against rotation, means for positively rotating said rotor element, and means for regulating the vertical position of said rotor with respect to the ground.

3. A harrow comprising a frame adapted to be supported on a wagon chassis, the rear end of said frame projecting beyond the rear extremity of said chassis, said projecting portion being pivotally connected to the remainder of the frame and carrying a toothed rotor element at its rear end, manually controlled means for locking said rotor against rotation, and manually controlled means for swinging said pivoted extension vertically to regulate the position of said rotor element with respect to the ground.

4. A harrow comprising a frame adapted to be supported on a wagon chassis, the rear end of said frame projecting beyond the rear extremity of said chassis, said projecting portion being pivotally connected to the remainder of the frame and carrying a toothed rotor element at its rear end, manually controlled means for locking said rotor against rotation, manually controlled means for positively rotating said rotor element, and means for swinging said pivoted extension vertically to regulate the position of the rotor element with respect to the ground.

5. Apparatus as claimed in claim 1 wherein said rotor element comprises a shaft rotatably mounted in suitable bearings on said frame, and two sets of teeth secured transversely to said shaft extending in opposite directions away from one another, the inner ends of the teeth of each set being arranged to engage and support the teeth of the opposite set intermediate their ends.

6. Apparatus as claimed in claim 1 wherein said rotor element comprises a shaft rotatably mounted in suitable bearings on said frame, oppositely disposed angle irons inclosing said shaft and secured thereto, and two sets of teeth secured to said angle irons and extending in opposite directions away from one another, the inner ends of the teeth of each set being arranged to engage and support the teeth of the opposite set intermediate their ends.

7. Apparatus as claimed in claim 4 wherein the means for regulating the position of the rotor element comprises a transverse shaft rotatably mounted in supports at the forward end of said frame, a pair of drums secured on said shaft and adapted to rotate therewith, means for causing the rotation of said shaft and drums, cables secured to said drums and adapted to be wound thereon upon the rotation of said shaft, the other ends of said cables being secured to a series of rods which are in turn connected to the rear end of the pivoted portion of said frame, whereby when said cables are reeled on or off of said drums, said rotor element will be raised or lowered with respect to the ground.

In testimony whereof I affix my signature.

WILLIAM A. ELLIOTT.